United States Patent [19]
Schmidt

[11] 3,753,383

[45] Aug. 21, 1973

[54] POWER OPERATED DRAWBOLT

[75] Inventor: Frederick L. Schmidt, Fond du Lac, Wis.

[73] Assignee: Giddings & Lewis, Inc., Fond du Lac, Wis.

[22] Filed: Apr. 4, 1972

[21] Appl. No.: 241,028

[52] U.S. Cl. ................................. 90/11 D, 279/1 E
[51] Int. Cl. ............................................ B23b 5/26
[58] Field of Search ............................ 9/110, 11 A; 408/239 A; 279/1 E

[56] References Cited
UNITED STATES PATENTS

| | | | |
|---|---|---|---|
| 3,254,567 | 6/1966 | Daugerty | 90/11 D |
| 2,667,819 | 2/1954 | De Vlieg | 90/11 D |

*Primary Examiner*—Gil Weidenfeld
*Attorney*—C. Frederick Leydig, Dennis R. Schlemmer et al.

[57] ABSTRACT

A power drawbolt assembly for releasably clamping a tool in the socket of a machine tool spindle. The assembly includes a drawbolt that is biased in a rearward direction relative to the spindle and in an opposite forward direction relative to a concentrically mounted drive sleeve whereby the drawbolt is readily accessible for engaging a tool automatically inserted into the spindle socket and is resiliently supported to absorb excessive axial forces that may be imparted to the drawbolt. A separate ejector tube mounted concentrically on the drawbolt is adapted to be forwardly moved relative to the spindle and drawbolt to strike and positively release a tool adaptor from seating engagement with the spindle socket after the drawbolt has completely unthreaded from the tool adaptor. The operation of the drawbolt and ejector tube are synchronized by an actuating mechanism driven from a single motor.

17 Claims, 15 Drawing Figures

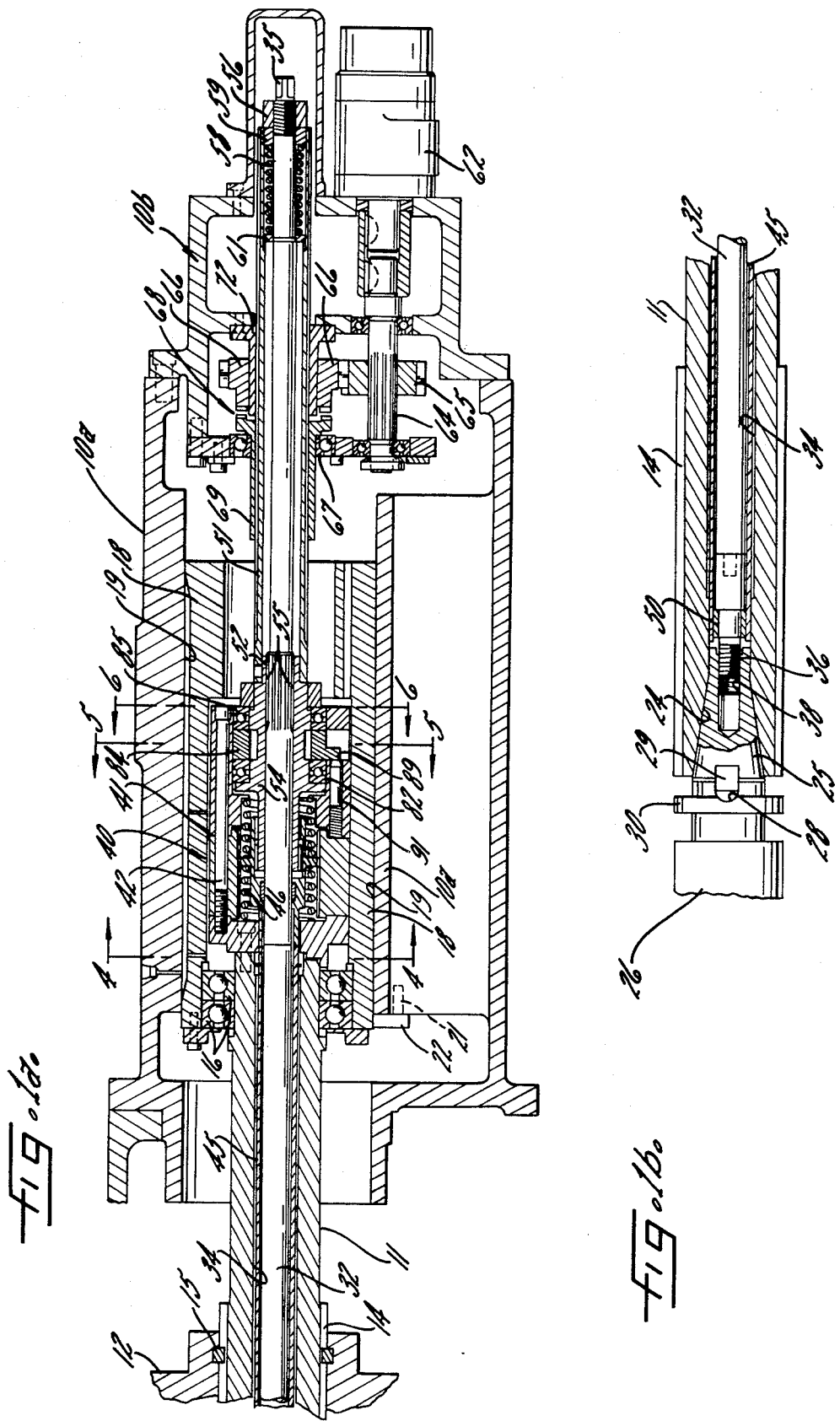

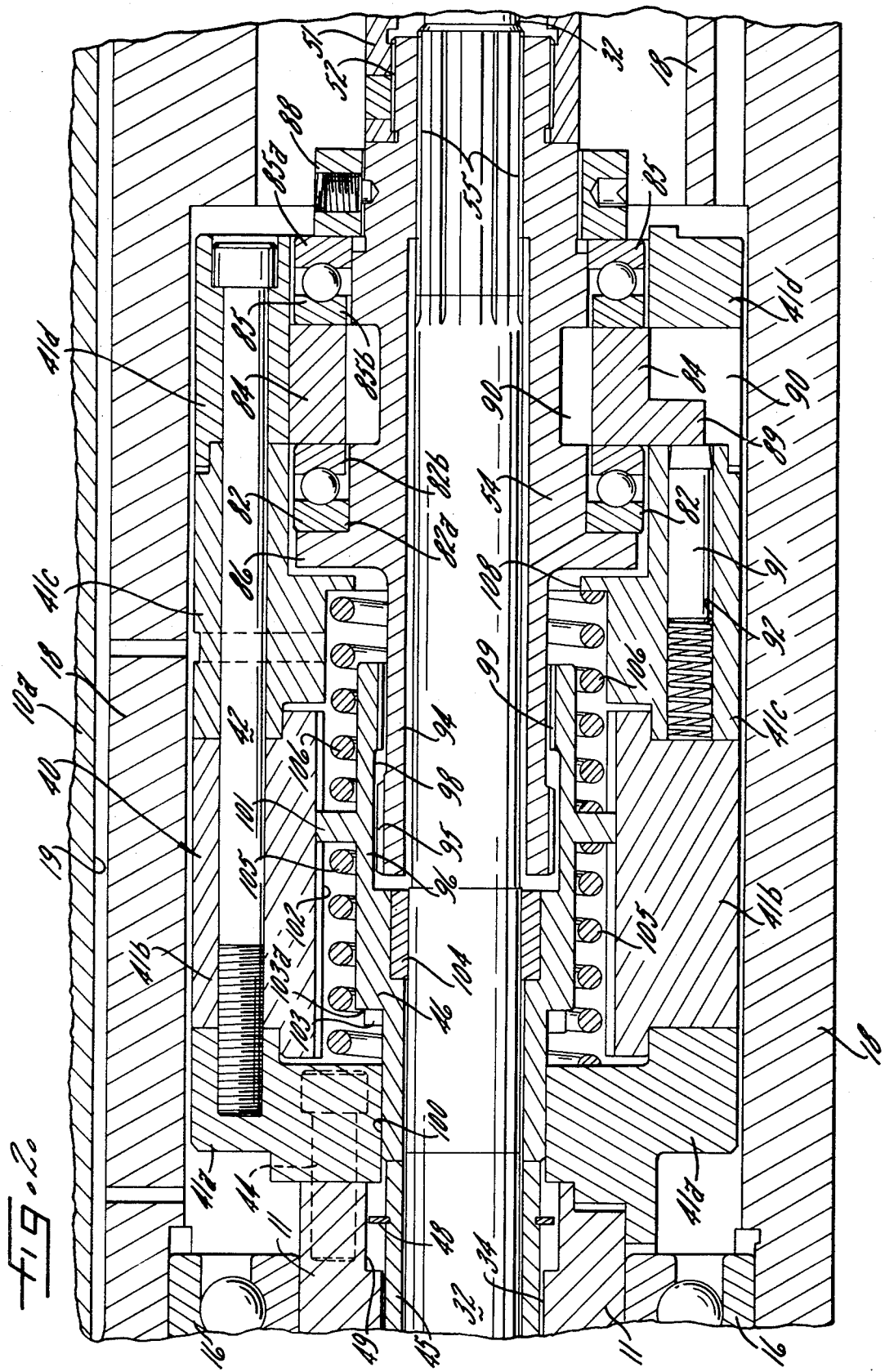

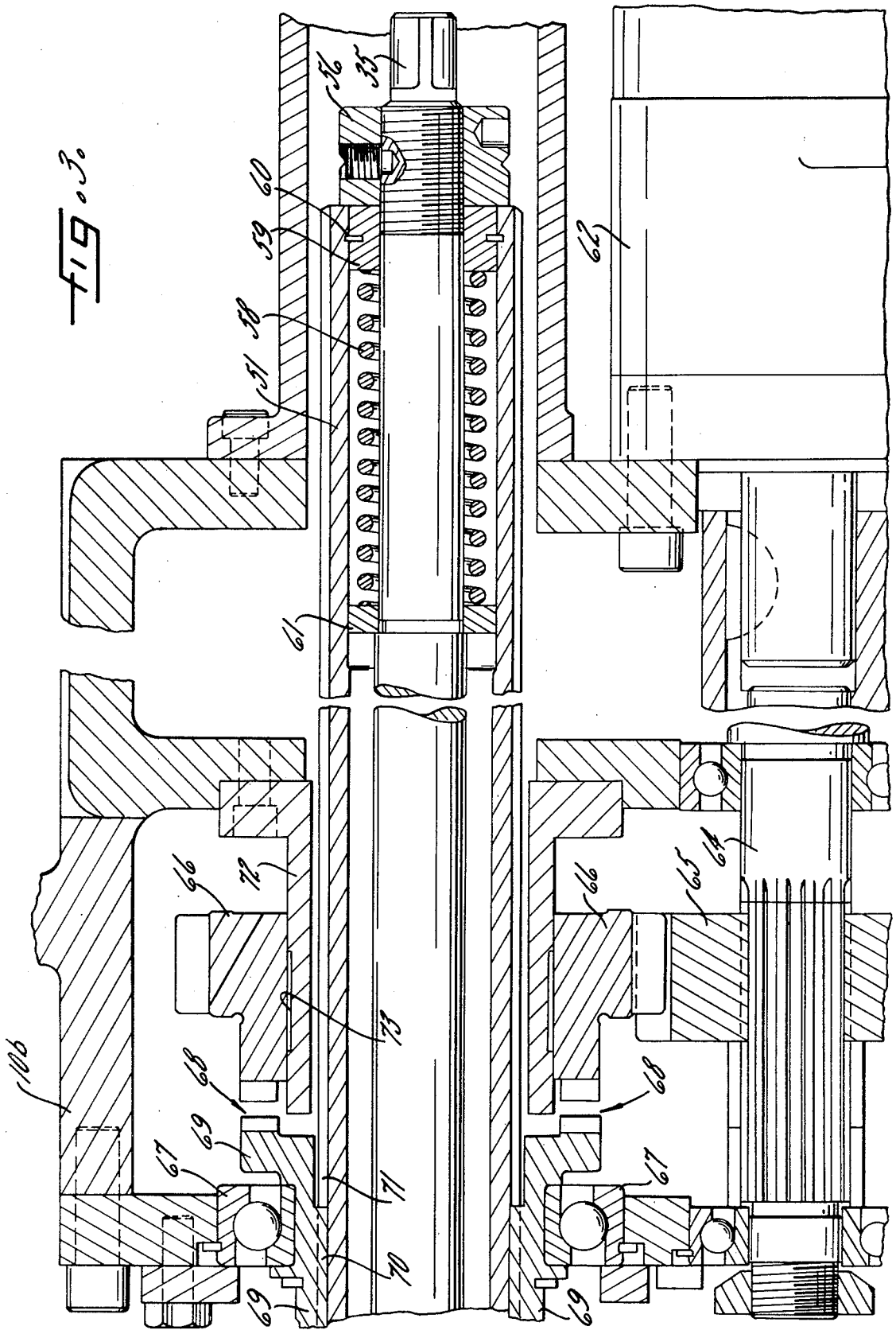

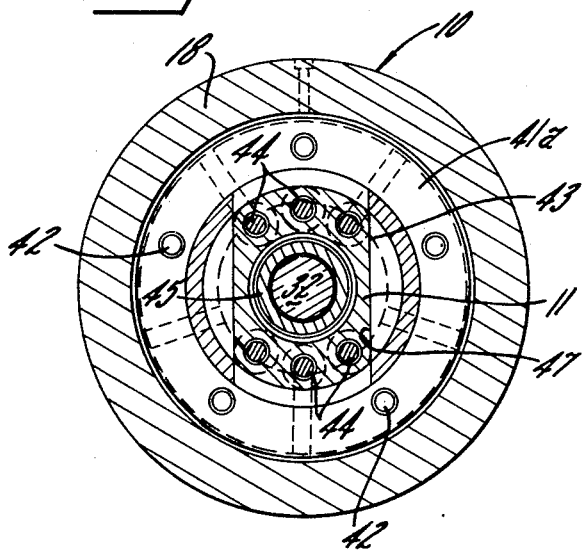
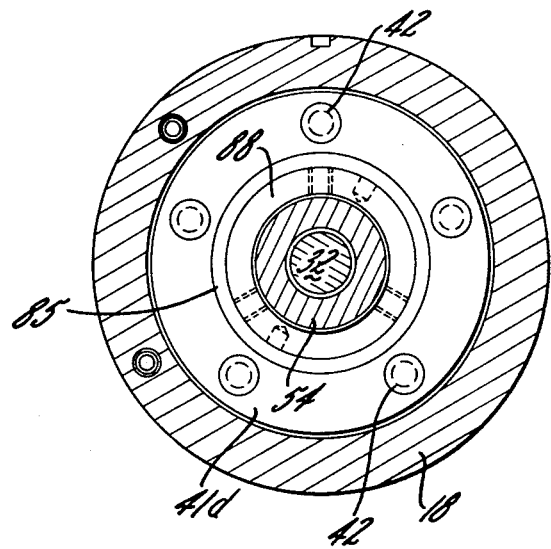
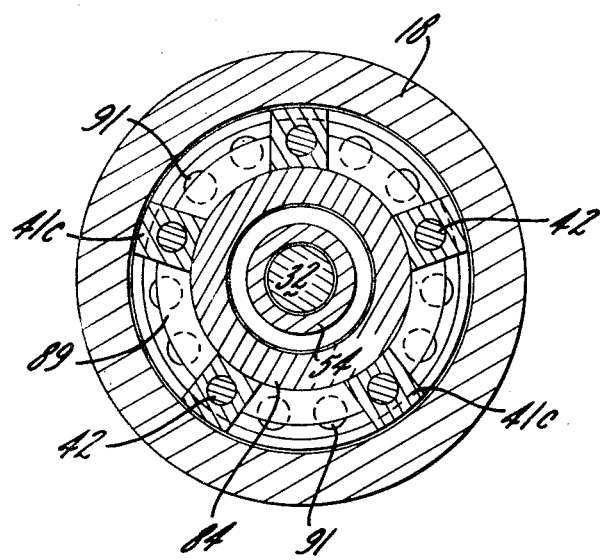

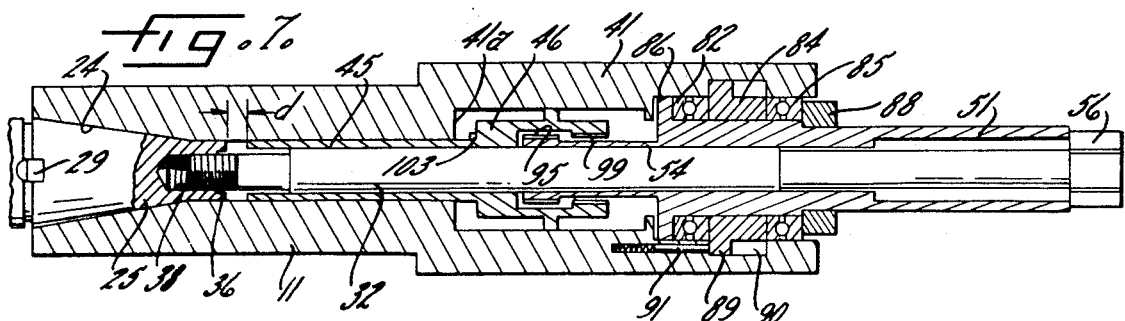
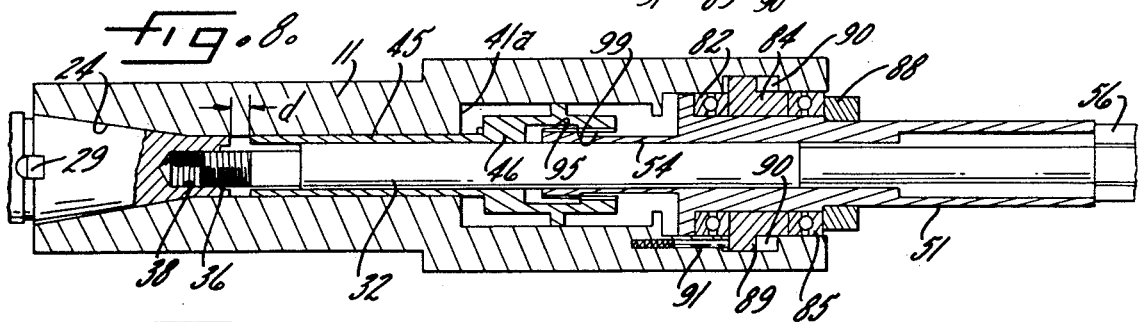
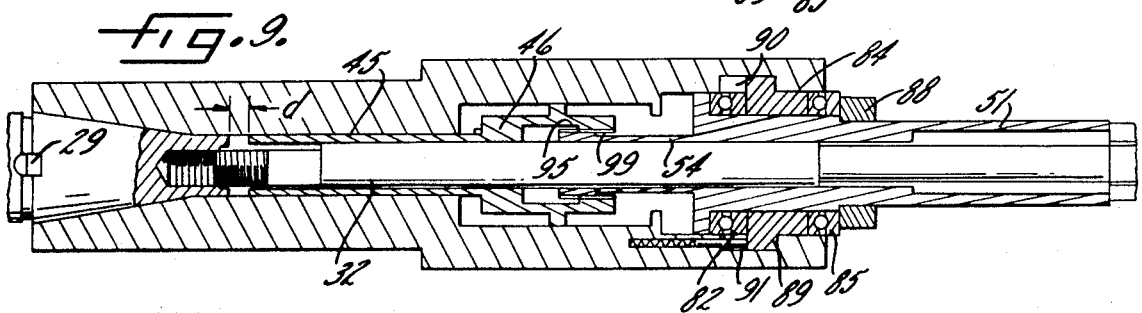
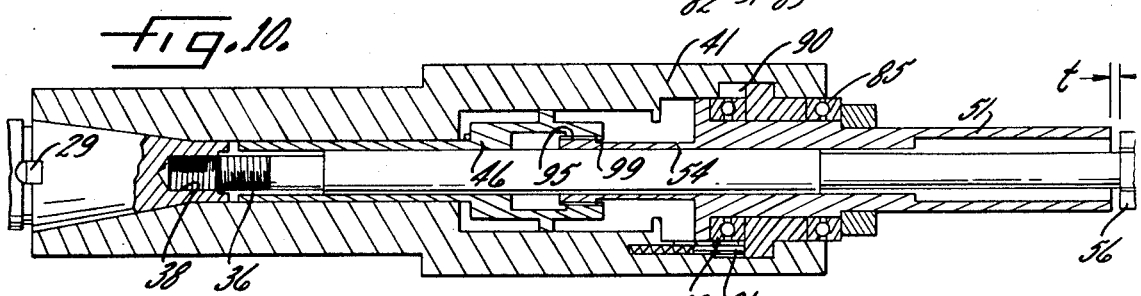
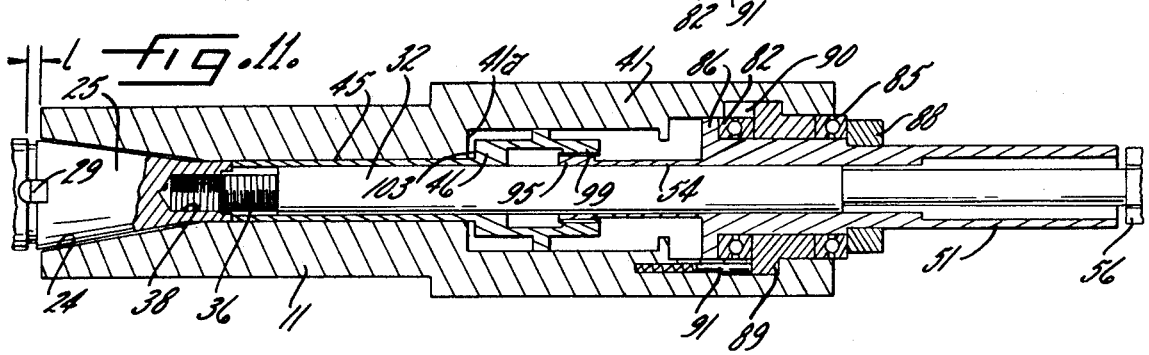

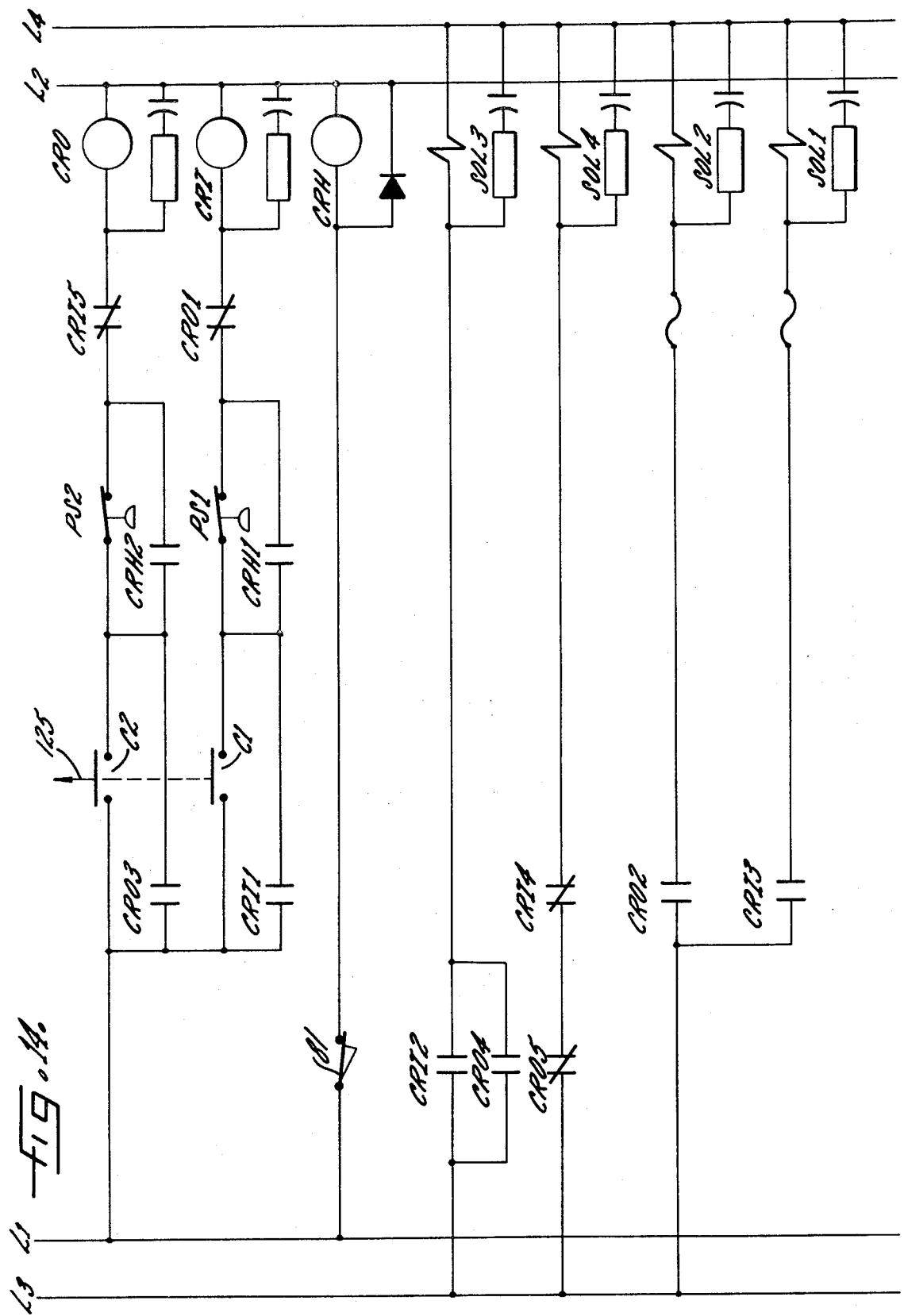

POWER OPERATED DRAWBOLT

DESCRIPTION OF THE INVENTION

The present invention relates to machine tools and, more specifically, to rotary drawbolt mechanisms for selectively locking and releasing a tool in the power driven spindle of a machine tool. The invention finds particular, but not exclusive, utlity when embodied in a machine tool which includes automatic tool changing apparatus.

A wide variety of drawbolt designs have evolved to date in a continuing effort to meet the demands of more complex machine tools, such as those with automatic tool changers. In such machines the drawbolt must efficiently function to securely engage and release tools without operator assistance. Many present drawbolt constructions, however, have been complex and have experienced problems. For example, in present machines where the drawbolt is biased rearwardly into the spindle to insure engagement of the tool adaptor with the spindle drive keys prior to contact with the drawbolt, the outer threaded end of the drawbolt often is not sufficiently accessible for reliably engaging a tool adaptor that is automatically inserted into the spindle socket. As a result, such rearwardly biased drawbolts, while having certain inherent advantages, have not previously been well-suited for machines with automatic tool changers.

In present drawbolt constructions, the threaded end of the drawbolt also commonly experiences excessive wear after repeated automatic tool change operations. Such thread wear can result from the forceful manner in which a tool changer places a tool adaptor against the drawbolt. Wear and damage to the drawbolt threads also has occurred when attempts have been made to positively eject a tool from the spindle socket, since such ejection frequently begins while the tool is still in partially threaded engagement with the drawbolt.

Maintenance and repair of drawbolts in today's large complex machines have presented further problems. Conventional drawbolts generally are removable from the rearward end of the machine so that when such a machine is installed with the rear side in close proximity to a wall, it has not been possible to remove the drawbolt for repair or replacement without substantial disassembly of the machine.

It is an object of the present invention to provide an improved power drawbolt mechanism that is adapted for use in machines equipped with automatic tool changers and which is susceptible of simple, rapid, and reliable operation.

Another object is to provide a drawbolt mechanism as characterized above in which the drawbolt is rearwardly biased relative to the spindle, but is readily accessible for engaging tools that are automatically inserted into the machine tool spindle.

A further object is to provide a drawbolt mechanism for the foregoing type that is adapted to engage and disengage tools which are automatically inserted into a machine tool spindle without incurring excessive wear or damage to the drawbolt threads.

A related object is to provide a drawbolt mechanism of the above type which positively ejects a tool from the machine tool spindle only after the drawbolt has completely unthreaded from the seated tool adaptor.

Still another object is to provide a spindle drawbolt as characterized above that is removable from the machine tool spindle from the front end thereof in a quick and simple manner.

Yet another object is to provide a drawbolt mechanism of the above kind that is particularly suited for use with tools having American National Standard Tool adaptor shanks.

Other objects and advantages of the invention will become apparent upon reading the foregoing detailed description and upon reference to the drawings, in which:

FIG. 1a is a fragmentary longitudinal section of a machine tool headstock equipped with a drawbolt illustrative of the present invention;

FIG. 1b is a fragmentary longitudinal section of the forwardmost end of the drawbolt and spindle shown in FIG. 1a, showing a cutting tool mounted in place;

FIGS. 2 and 3 are enlarged section views of portions of the drawbolt actuating mechanism shown in FIG. 1a;

FIGS. 4–6 are sections taken in the planes of lines 4—4, 5—5, and 6—6, respectively, in FIG. 1a;

FIGS. 7–11 are schematic section views of the drawbolt mechanism shown in FIG. 1a, illustrating the sequential steps in disengaging and positively ejecting a tool from the machine tool spindle;

FIG. 12 is a fragmentary view showing the drive for the drawbolt mechanism shown in FIG. 1a;

FIG. 13 is a schematic representation of a hydraulic circuit for operating the drawbolt mechanism shown in FIG. 1a;

FIG. 14 is a schematic representation of an electrical control system for use in contro'ling the operation of the drawbolt shown in FIG. 1a.

Figure 13:
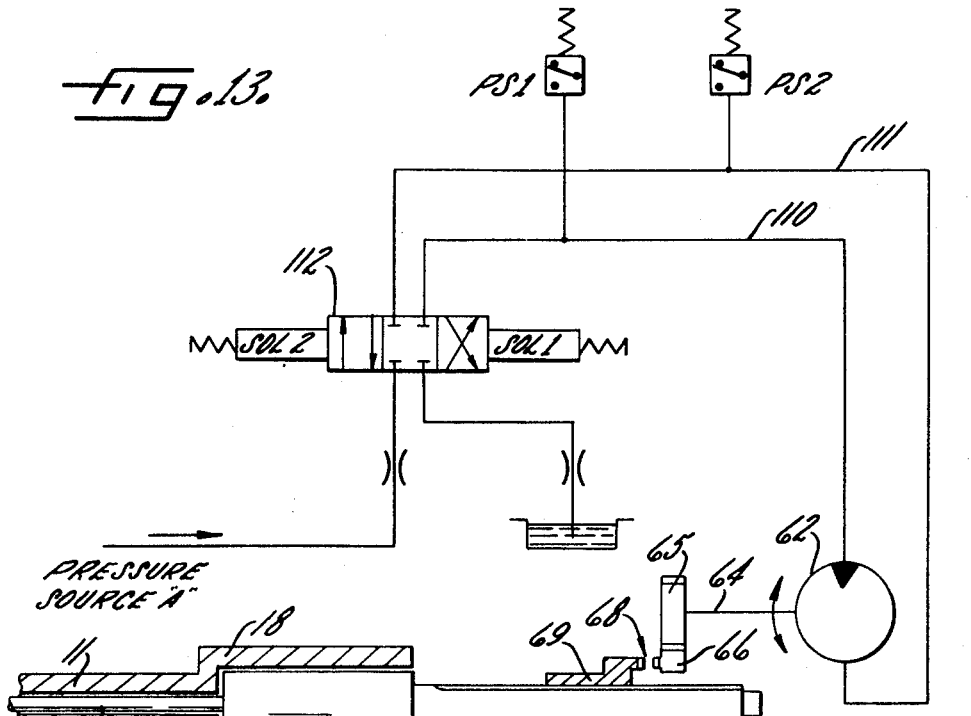

While the invention is susceptible of various modifications and alternative constructions, a certain illustrated embodiment has been shown in the drawings, and will be described below in detail. It should be understood, however, that there is no intention to limit the invention to the particular form disclosed herein, but on the contrary, the intention is to cover all modifications, alternative constructions, and equivalents falling within the spirit and scope of the invention.

Referring more specifically to FIGS. 1a and 1b of the drawings, there is shown an illustrative machine tool headstock 10 having an extensible power driven spindle 11. The spindle 11 is supported in a rotary drive sleeve 12 for axial movement relative to the drive sleeve 12. The spindle 11 is formed with elongated keyways 14 which slidably engage keys 15 anchored by the sleeve 12 to guide sliding movement of the spindle. To rotatably drive the spindle 11, the sleeve 12 is rotated by a suitable drive means (not shown).

To facilitate axial movement of the spindle 11 relative to the drive sleeve 12 and headstock 10, the rearward end of the spindle is rotatably journaled in thrust bearings 16 carried within a ram 18. The ram 18 is slidably disposed within a bore 19 formed in an extension 10a of the headstock 10. For axially moving the ram 18 and selectively positioning the spindle to plurality of positions as required for machining purposes, a hydraulic cylinder 21 (partially shown in FIGS. 1a and 12) is anchored to the headstock extension 10a and connected to a depending flange 22 of the ram 20. By supplying hydraulic fluid to the cylinder 21 axial forces may be imparted to the ram 18, thrust bearings 16, and spindle 11 so as to move the spindle axially.

The forward end of the spindle 11 is formed with a tapered socket 24 for receiving a corresponding complementary tapered shank of a standard tool adaptor 25 which in this case carries a milling cutter 26. The taper tool adaptor shank and spindle socket afford a wedging action for holding the tool securely within the spindle socket. To provide a driving connection between the tool adaptor 25 and spindle 11, the tool adaptor is formed with key slots 28 engageable with forwardly extending keys 29 on the end of the spindle 11. The tool holder also is formed with a flange 30 which may be utilized as a gripping area by automatic tool changing apparatus for handling the tool.

In order to releasably secure the tool adaptor 25 in the spindle socket 24, a power drawbolt assembly embodying the present invention is provided. The drawbolt assembly comprises a tool engaging drawbolt 32 mounted coaxially of the spindle 11 within a bore 34 for both rotation and translation. The drawbolt 32 projects rearwardly through and beyond the ram 18 a substantial distance and has its extreme rear end formed with a square head 35 that may be engaged by a wrench for manual rotation of the drawbolt if necessary. The forward end of the drawbolt 32 has a threaded portion 36 projecting into the spindle socket 24 for engaging a tapped hole 38 in the end of a tool adaptor 25. By rotating the drawbolt 32 relative to the spindle 11 with the tool adaptor 25 held against rotation, the drawbolt can threadably engage the tool adaptor and draw it into tight seating engagement with the spindle socket 24.

In accordance with the invention, the drawbolt is biased in a rearward direction relative to the spindle by a first biasing means and is biased in an opposite direction a limited amount by a second biasing means, whereby the drawbolt is readily accessible for engaging a tool that is automatically inserted into the spindle socket and is resiliently supported to absorb excessive axial forces that may be imparted to the drawbolt. After a machining operation, the drawbolt mechanism will by successive steps completely disengage the tool holder annd then positively release or eject it from engagement with the spindle socket. To this end, there is provided a drawbolt actuator unit 40 which includes a housing 41 disposed within the ram 18 in fixed abutting relation to the spindle 11. The actuator unit housing 41 has a sectionalized generally cylindrical construction comprising end sections 41a, 41d, and intermediate sections 41b, 41c all secured in abutting relation by bolts 42 (FIG. 2). The rear end of the spindle has an elongated key 43 which mates in a slot 47 in the forward side of the housing section 41a and is secured thereto by screws 44 (FIGS. 2 and 4).

The forward end of the drawbolt 32 located within the spindle 11 is enveloped by an axially movable ejector tube 45 which in turn is supported within the spindle bore 34. One end of the ejector tube 45 extends to a position near the spindle socket 24 and the other end is fixed in abutting relation to the forward end of a floating sleeve 46 which is supported for axial movement within the housing 41. A lock ring 48 supported on the outer periphery of the tube 45 extends radially into a recess 49 formed in the spindle to axially retain the tube 45 in the spindle for limited endwise motion as determined by the length of the recess 49 (FIG. 2). A plain bearing 50 placed on a reduced forward section of the drawbolt supports the drawbolt 32 within the tube 45 for axial and rotary motion (FIG. 1b).

The projecting rear end of the drawbolt is enveloped by an externally splined drive sleeve 51 which is fixedly secured by a threaded connection 52 at its forward end to a stop sleeve 54 located within the actuator unit housing 41 (FIGS. 1a, 2 and 3). The stop sleeve 54 is mounted on the drawbolt 32 for relative axial movement by a spline connection 55. The drawbolt 32 is resiliently coupled to the drive sleeve 51 and stop sleeve 54. To that end, a nut 56 and a spring 58 located on the drawbolt lie on opposite sides of a washer 59 retained within the drive sleeve 51 by a lock ring 60. The spring 58 is axially contained between the drive sleeve washer 59 and a washer 61 held against a shoulder on the drawbolt 32. The setting of the nut 56 bearing against the end of the drive sleeve 51 maintains the spring 58 under compression, biasing the drawbolt in a forward direction relative to the drive sleeve 51. It will be appreciated that by merely removing the nut 56 from the rear end of the drawbolt, the drawbolt 32 may be readily removed from the front socket end of the spindle for quick repair or replacement if necessary.

Figure 12:
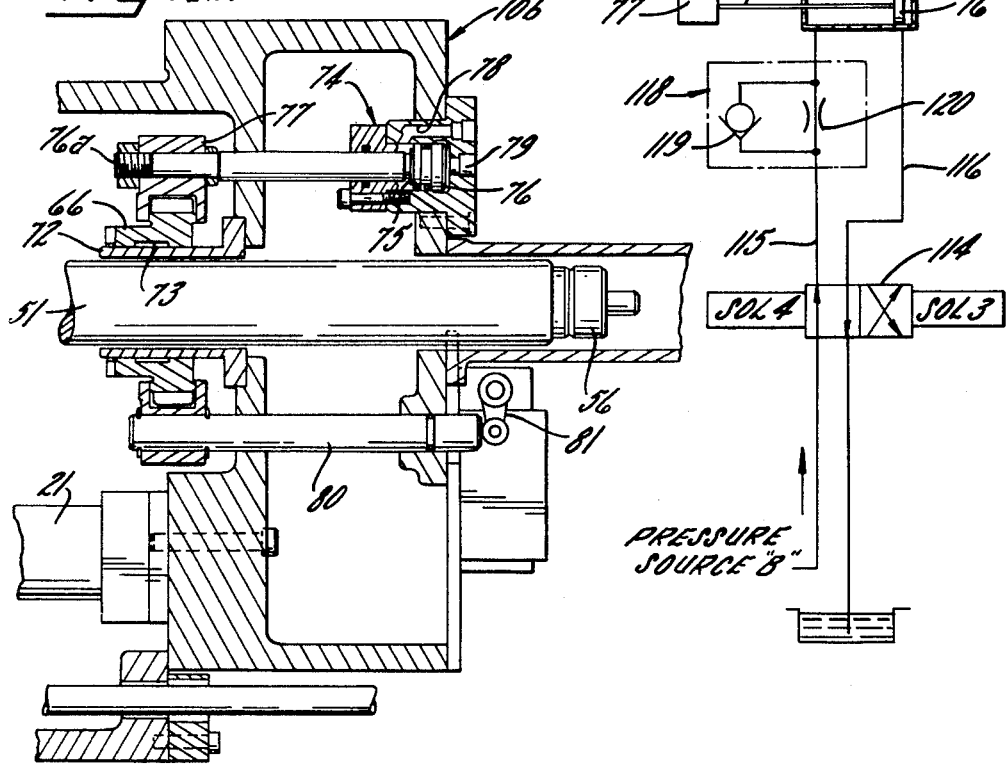

To rotatably drive the drawbolt 32, a hydraulic motor 62 is mounted on the headstock 10. The motor 62 is coupled to the drive sleeve 51 through a gear transmission which includes a shaft 64, gear 65, clutch gear 66, a positive jaw tooth clutch 68, and a driver 69 which has internal splines 70 engaged with external splines 71 of the drive sleeve 51. (FIGS. 1a and 3). The driver 69 is supported within an extension 10b of the headstock 10 by anti-friction bearings 67 for rotation with the drive sleeve 51. To releasably engage the clutch 68, the clutch gear 66 is shiftable axially on a fixed stub shaft 72 by a hydraulically operated gear shift mechanism 74 (FIG. 12). To facilitate such axial movement of the clutch gear 66 a lubricant may be provided in a recess 73 in the shaft 72.

The gear shift mechanism 74 includes a hydraulic cylinder 75 having a piston 76 with an axially extending piston rod 76a. The outermost end of the piston rod 76a is connected to the clutch gear 66 by a connector 77 that permits rotational movement of the gear 66. By selectively applying pressure to opposite sides of the piston 76 through ports 78 and 79, the rod 76a may be selectively shifted to axially move the clutch gear 66 to engage and disengage the clutch 68. A guide shaft 80 also attached to the shiftable clutch gear 66 by the connector 77 operates an interlock switch 81 incorporated in the electrical control for the drawbolt operation, which will be described below. It can be seen that by engaging the clutch 68, the motor 62 may rotate the drive 69, which in turn rotates the drive sleeve 51 and stop sleeve 54, with the latter driving the drawbolt 32 through the spline coupling 55.

For the purpose of limiting axial movement of the stop sleeve 54 and drive sleeve 51 to a determined range, a thrust bearing 82, spacer 84, and thrust bearing 85 are supported between a radial flange 86 on the stop sleeve 54 and a nut 88 mounted on the stop sleeve 54 in axially spaced relation from the flange 86. The spacer 84 is formed with a plurality of circumferentially spaced radial projections 89 which each are retained for limited axial movement in a respective radial slot 90 in the actuator unit housing 41. In order that the spacer 84 may be held against rotation with the projections 89 in the slots 90 while the drive sleeve 51 and stop sleeve 54 are rotatably driven, only one race 82a, 85a of each thrust bearings 82, 85 engages the stop sleeve 54, while the other race 82b, 85b has a greater inner diameter so as not to contact the stop sleeve. Spring loaded plungers 91 supported within bores 92 in the housing 41 engage the spacer projections 89 to bias the spacer 84, stop sleeve 54, drive sleeve 51 and drawbolt 32 in a rearward direction relative to the spindle (to the right as viewed in FIG. 1a).

The stop sleeve 54 is formed with a cylindrical projection 94 which extends forwardly within the actuator unit housing 41 and has an externally threaded end 95, as best shown in FIG. 2. The floating sleeve 46 has a rearward cylindrical projections 96 which telescopes over the projection 94 of the stop sleeve 54 and is formed with an internal recess 98 capable of receiving the externally threaded end 95 of the stop sleeve. The rearward end of the floating sleeve projection 96 has internal threads 99 disposed in axial alignment with the threads 95 of the stop sleeve for threadable engagement therewith. The floating sleeve 46, which is supported for axial movement within the housing 41, has a forward cylindrical bearing surface 100 supported in the front end housing section 41a and radial flange 101 with an external spline for slidably engaging an internal spline 102 on the housing 41. A bearing 104 is interposed between the floating sleeve 46 and the drawbolt 32 to permit relative rotational and sliding movement, and a spacer 103 is provided at the rearward end of the bearing surface 100 adjacent a shoulder 103a formed in the sleeve. To resiliently support the floating sleeve 46 at a centralized position within the housing 41, a pair of springs 105 and 106 are providd on opposite sides of the flange 101 where they are retained endwise by the front housing section 41a and an inwardly directed radial flange 108 formed in the housing section 41c. When the drawbolt 32 has fully engaged the tool adaptor 25 and drawn it into seating engagement with the spindle socket 24, the stop sleeve 54 and floating sleeve 46 are disposed within the housing 41 with their thread ends 95 and 99 out of contact, as shown in FIGS. 1a, 1b, and 2.

To illustrate the operation of the drawbolt 32 when disengaging and engaging a tool in the spindle 11, reference may be made to FIGS. 7–11. FIG. 7 illustrates the position of the drawbolt when it is in fully threaded engagement with a tool adaptor seated in the spindle socket, such as shown in FIGS. 1a and 1b. The ejector tube 45 is retracted a distance "d", for example one-fourth inch, from the inner end of the tool adaptor 25 with the threaded ends 99, 94 of the floating sleeve 46 and stop sleeve 54, respectively, being out of engagement allowing the floating sleeve 46 to centralize under the bias of the springs 105 and 106. The tool adaptor 25 is positively held in the spindle socket by an axial clamping force resulting from the cooperation of the drawbolt 32 and spindle 11 on the tool adaptor 25. Metal to metal support for the drawbolt clamping force can be traced from the nut 56 at the rear of the drawbolt upon which the drive sleeve 51 abuts, through the drive sleeve 51 and stop sleeve 54 to the spacer 84 and its projections 89 which abut the forward end of the slots 90 in the housing 41, and through the housing 41 to the spindle 11.

Unclamping of the tool adaptor 25 is illustrated commencing with FIG. 8. To initiate unclamping, the drawbolt hydraulic motor 62 is energized and the clutch 68 engaged to cause the drawbolt 32 and stop sleeve 54 to be rotated in a counterclockwise direction, as viewed in FIG. 5. During the resulting unthreading of the drawbolt from the tool adaptor, the stop sleeve 54, drive sleeve 51, and drawbolt 32 are moved axially to the rear relative to the spindle 11 due to the bias of the plungers 91 acting on the projections 89 of the spacer 84 supported by the stop sleeve 54. This rearward biasing of the drawbolt insures that the tool adaptor will not disengage from the spindle keys 29 as long as the drawbolt is connected to the tool adaptor. With sufficient rearward axial movement of the drawbolt 32 and stop sleeve 54, the threads 95 of the stop sleeve engage the threads 99 of the floating sleeve. (FIG. 8). With continued rotation of the drawbolt, rearward axial movement of the stop sleeve 54 is terminated by engagement of the spacer projections 89 with the rearward end of the housing slots 90. (FIG. 9). Thereupon, continued rotation of the drawbolt 32 and the stop sleeve 54 causes outward movement of the floating sleeve 46 by increasing engagement of the stop sleeve and floating sleeve threads 95, 99, which in turn forces the ejection tube 45 outwardly. (FIG. 10). At the same time, the further unthreading of the drawbolt 32 from the tool adaptor 25 continues to move the drawbolt rearwardly, while axial movement of the stop sleeve 54 and drive sleeve 51 is halted by the spacer projections 89 engaging the rearward end of the housing slots 90. When the drawbolt has completely unthreaded from the tool adaptor, the drawbolt has moved a distance "t", about one-eighth inch, rearward relative to the stop sleeve 54 and drive sleeve 51, thereby increasing the bias of the spring 58 acting on the drawbolt. (FIG. 10).

After the drawbolt has completely unthreaded from the tool adaptor 25 (FIG. 10), the ejector tube 45 then moves into abutting relation with the tool adaptor 25 so that further outward movement of the ejector tube from the additional engagement of the stop sleeve and floating place threaded portions 95, 99 positively forces the tool adaptor out of seating engagement with the spindle socket (FIG. 11). It will be seen that since the drawbolt is completely unthreaded from the tool adaptor and has moved rearwardly with respect to the drive sleeve 51 (FIG. 10) well before the ejection tube 45 moves into contact with the tool adaptor, ejection of the seated tool adaptor from the spindle socket (FIG. 11) will not damage or wear the threads of the drawbolt or the tool adaptor. It has been found that the ejector tube need only move the tool adaptor 25 a relatively small distance "l", such as 0.031 inches, to effect reliable release of the tool adaptor from the spindle socket so that it can be readily removed by automatic tool changing apparatus. To limit outward movement of the floating sleeve 46 and ejector tube 45, the spacer 103 mounted on the floating sleeve 56 engages an end face of the housing section 41a. (FIG. 11). Upon engagement of the spacer 103 with the housing section 41a, the unthreading of the floating sleeve 46 from the stop sleeve is halted to complete the ejection cycle and the motor 62 will automatically be stopped due to the resulting pressure rise which operates a pressure switch, as will be explained below. The clutch 68 is then also disengaged.

Upon removal of the tool adaptor from the spindle socket, the drawbolt 32 will move forward the distance "t" under the bias of the spring 58 so that the nut 45 at the rear of the drawbolt engages the end of the drive sleeve 51 and the threaded drawbolt end 36 is in a forward position for readily engaging a new tool that may be positioned in the spindle. The threaded portions 95, 99 off the stop sleeve 54 and floating sleeve 46, however, remain engaged during this time so that the ejector tube 45 is maintained in its forwardmost position.

For placing and clamping a new tool in the spindle, the foregoing sequence is substantially reversed. Placement of a new tool adaptor 25 in the spindle socket 24 will cause an initial contact between the end of the adaptor 25 and the drawbolt 32. In the event that the tool adaptor is forcefully inserted into the spindle socket, either manually or by an automatic tool changer, the drawbolt may move rearwardly against the bias of the spring 58 so as to tend to absorb the excessiveness of the impact force and prevent damage to the threads at the drawbolt end. The ejector tube 45, by reason of being in its forwardly extended position, however, will prevent insertion of a tool adaptor completely into the spindle socket by holding it a slight distance "*l*" out of seating engagement with the socket 24 as determined by the spacer 103. (FIG. 11). Whether the tool adaptor is forced all the way into abutting relation with the ejector tube or is carefully placed against the end of the drawbolt without substantially compressing the spring 58, the spindle drive keys 29 will engage the tool adaptor keyways 28 to prevent the tool from turning when the drawbolt is subsequently operated to draw in and clamp the tool in place.

To initiate positive clamping of the new tool in the spindle socket, the reversible hydraulic motor 62 is operated in the opposite direction and the clutch 68 reengaged so that the drawbolt 32 is rotated in a clockwise direction, as viewed in FIG. 5. Initial rotation of the drawbolt causes the ejection tube 45 to recede by reason of the floating sleeve 46 being moved rearwardly by the disengaging action of the stop sleeve and floating sleeve threaded portions 94, 99. Since the drawbolt 32 is biased forwardly into contact with the tool adaptor 25 by the spring 58, rotation of the drawbolt will cause the tool adaptor and drawbolt threads 38 and 36 to immediately engage, thereby moving the drawbolt 32 forwardly simultaneously with the receding movement of the ejection tube 45. (FIG. 9). When the drawbolt has advanced sufficiently that the nut 56 at the rearward end thereof engages the drive sleeve 51, continued forward movement of the drawbolt 32 through additional engagement of the adaptor and drawbolt threads 38, 36 will move the drive sleeve 51 and stop sleeve 54 forwardly. (FIG. 8). During such forward movement, the threads 95, 99 of the stop sleeve 54 and floating sleeve 46 will completely disengage allowing the floating sleeve 46 to again centralize under the bias of the springs 105, 106. Upon still additional threading engagement of the drawbolt and adaptor, the drawbolt is moved forward until the spacer projections 89 engage the forward end of the slots 90. At this point, the drawbolt threads 36 fully engage the tool adaptor threads 38, and since the projections 89 prevent further forward movement of the drawbolt, the additional operation of the motor 62 will torque the drawbolt 32 to its clamped position (FIG. 7), at which time the motor 62 is cuased to automatically stop due to the pressure rise and the operation of a pressure switch, as will be explained.

Referring to FIG. 13, there is shown an illustrative hydraulic circuit for reversibly operating the drawbolt 32. The reversible hydraulic motor 62, for driving the drawbolt 32 has two supply lines 110 and 111 that may be selectively connected to a pressure source A, or alternatively blocked, by a three-position solenoid operated valve 112. The valve 112 in this case has two solenoids SOL1 and SOL2. To drive the motor 62 and drawbolt 32 in the tool clamping direction, the pressure source A, which may, for example, have a pressure of 1,250 psi, is connected to the line 110 by energizing the solenoid SOL1 to move the valve 112 to the left, as viewed in FIG. 13. When the line 111 is connected to the pressure source A, by reason of energizing the solenoid SOL2 to shift the valve to the right, the motor is driven in the opposite direction for disengaging a tool from the spindle. When both solenoid SOL1 and SOL2 are deenergized the valve 112 is in the position shown in FIG. 13, which blocks both lines 110 and 111 and thereby deenergizes the motor 62.

In order to limit the maximum torque developed by the motor 62 during clamping of the drawbolt and to deenergize the motor when that pressure is reached, a pressure switch PS1 set to trip at a determined pressure, for example 1,200 psi, is connected to the line 110. Likewise, to deenergize the motor 62 when a similar maximum torque is developed in the line 111 during unclamping of a tool, a pressure switch PS2 is provided. The pressure switches PS1 and PS2 are incorporated in the electrical control for the drawbolt, as will be described below.

To reversibly operate the clutch 68 between its engaged and disengaged positions upon starting and stopping of the hydraulic motor 62, respectively, a two-position solenoid-operated valve 114 having solenoids SOL3 and SOL4 is connected to the hydraulic cylinder 75 by lines 115 and 116. When the motor 62 is deenergized, such as by triggering of one of the pressure switches PS1 or PS2, the solenoid SOL4 is actuated by electrical circuitry to be described below and moves the valve 114 to the position shown in FIG. 13 which connects the line 115 to a pressure source B, having a pressure of for example 500 psi. Pressurized fluid from the line 115 flows into the cylinder 75 causing movement of the piston 76, piston rod 76a, and attached clutch gear 66 to the right as shown in FIG. 13 to disengage the clutch 68. When the such clutch disengaging position, the shaft 80 extending from the clutch gear 66 closes the limit switch 81. On the other hand, when the motor 62 is energized, the solenoid SOL3 is energized and shifts the valve 114 to the left, as viewed in FIG. 13, to connect line 116 with pressure source B thereby moving the piston 76 and clutch gear 66 to the left to the clutch engaging position. As the clutch is engaged, the shaft 80 moves out of contact with the limit switch 81 allowing it to open.

Provision is made in the illustrated embodiment for delaying the engagement of the clutch 68, and thus the activation of the limit switch 81, until a short time after the hydraulic motor 62 is energized to enable the motor 62 to develop sufficient torque to break the frictional contact between the threads of the drawbolt 32 and tool adaptor 25 during an unclamping operation or the frictional contact between the threads of the floating sleeve 46 and stop sleeve 54 during a tool clamping operation. To this end, a control valve 118 is located in the hydraulic supply line 115. The valve 118 includes a check valve 119 that permits unrestricted flow to the cylinder 75 from the pressure source B when the clutch 68 is being disengaged. However, discharge from the cylinder 75 into the line 115 during movement of the piston 76 to the clutch engaging position is controlled by a restrictor 120 in the valve 118 which causes a slowdown in the engagement of the clutch 68, and thus, a delay in the opening of the limit switch 81.

The operating cycle for the hydraulic circuitry is controlled by an illustrative electrical circuit shown in FIG. 14 which includes two sets of power lines, L1, L2 and L3, L4. Energization of the motor 62 to effect drawing in and clamping of a tool adaptor 25 by the drawbolt 32 is initiated by turning a spring centered switch 125 in a determined direction, for example to the right as viewed in FIG. 14. The switch 125 may be manually operated, or alternatively, when the drawbolt is incorporatd in an automatically operated machine, such as one with automatic tool changing, the switch 125 could be solenoid operated. Actuation of the switch 125 closes contact C1 to energize a relay CRIthrough the normally closed contacts of the pressure switch PS1 and contacts CRO1. Contact CRI1 which is closed by energization of the relay CRI establishes a holding circuit around the contact C1 after the spring centered switch 125 is released. Contact CRH1, which is closed only when the limit switch 81 is closed and relay CRH energized, establishes a holding circuit around the pressure switch PS1 during the initial start-up of the hydraulic motor 62. With energizing of the relay CRI, contacts CRI2 and CRI3 are closed and contacts CRI4 and CRI5 are opened to simultaneously energize solenoids SOL1 and SOL3 to operate the motor 62 and close the clutch 68. As the clutch 68 engages, the limit switch 81 is opened to deenergize the relay CRH, thereby opening the contact CRH1 and activating the pressure switch PS1. Due to the delay in engagement of the clutch resulting from passage of fluid through the restrictor 120, the holding circuit around the pressure switch PS1 established by the contact CRH1 remains closed for a sufficient time to maintain relay CRH energized to allow the motor 62 to develop the required torque to break the frictional contact between the threads of the floating sleeve and the stop sleeve.

Upon tightening of the drawbolt in the tool adaptor, a buildup of pressure in the hydraulic line 110 is created which trips the pressure switch PS1 causing the relay CRI to deenergize, dropping out contacts CRI1, CRI2, and CRI3 and closing contacts CRI4 and CRI5, thereby deenergizing solenoids SOL3 and SOL1 and energizing solenoid SOL4 which stops the motor 62 and disengages the clutch 62.

Rotation of the motor 62 in the reverse direction to effect unclamping of the tool adaptor 25 is initiated electrically by turning the spring center switch 125 to a determined position, for example to the left as shown in FIG. 14, closing contacts C2 which energizes relay CRO through the normally closed contacts of pressure switch PS2 and contact CRI5. Contact CRO3, closed by energization of the relay CRO, establishes a holding circuit around the contact C2 after the switch 125 has been released. Contact CRH2 establishes a holding circuit around the pressure switch PS2 during the initial start-up of the hydraulic motor. As in the case of the holding circuit for the pressure switch PS1, the contact CRH2 is closed only during the time the limit switch 81 is closed and the relay CRH energized. The limit switch 81 is adjusted to trip shortly before the clutch 68 is fully engaged.

With energizing of the relay CRO, contacts CRO2, CRO3 and CRO4 are closed and contacts CRO1 and CRO5 are opened to simultaneously energize solenoids SOL2 and SOL3 to operate the motor 62 and close the clutch 68. When the clutch 68 is closed, the limit switch 81 is opened to deenergize the relay CRH which opens the contacts CRH1 and activates the pressure switch PS2. Again, due to the delay in engagement of the clutch resulting from the passage of fluid through the restrictor 121, the holding circuit around the pressure switch PS2 established by the contact CRH2 remains closed for a sufficient time to maintain relay CRH energized to allow the motor 62 to develop the high torque required to break the frictional contact between the threads of the drawbolt 32 and the tool adaptor 25.

Continued operation of the motor 62 causes the drawbolt 32 to completely unthread from the tool adaptor 25 while advancing ejection tube 45 to a forward position that positively unseats the adaptor from the spindle socket 25. At the completion of the ejection cycle, the spacer 103 on the floating sleeve abuts the housing section 41a resulting in a pressure buildup in the line 111 which trips the pressure switch PS2. Opening of the pressure switch PS2 in turn deenergizes relay CRO which drops out contacts CRO2, CRO3, CRO4 to deenergize the solenoids SOL3 and SOL2 to stop the motor 62. Simultaneously, the contact CRO5 is closed to energize the solenoid SOL4 which disengages the clutch.

In view of the foregoing, it can be seen that the drawbolt mechanism of the present invention is susceptible of simple, precise and reliable operation and is well-adapted for use with machine tools equipped with automatic tool changers. It has been found that such drawbolt assembly may be operated over long periods of time in conjunction with automatic tool changers without damaging or excessively wearing the threads of the drawbolt or the tool adaptors.

What is claimed is:

1. A power drawbolt assembly for releasably securing a tool in the socket of a machine tool spindle, the tool having a tool adaptor with a threaded bore, the combination comprising a drawbolt journeled within said spindle for axial and rotary movement with respect thereto, one end of said drawbolt having a threaded portion projecting into said spindle socket for engaging an inserted tool adaptor, an ejector member mounted within said spindle bore adjacent said drawbolt for relative axial movement, means for rotating said drawbolt in one direction to threadably engage the end thereof with the bore of a tool adaptor placed in said socket to positively clamp said tool adaptor in tight seating engagement with said socket, means for rotating said drawbolt in an opposite direction to threadably disengage and unclamp a seated tool adaptor, and means responsive to further rotation of said drawbolt in a tool unclamping direction after said drawbolt has completely unthreaded from a seated tool adaptor for axially moving said ejector member in a forward axial direction relative to said spindle to strike said seated tool adaptor and positively release it from seating engagement with said spindle socket.

2. The drawbolt assembly of claim 1 in which said ejector member is a tube coaxially surrounding a forward portion of said drawbolt.

3. The power drawbolt assembly of claim 2 including a ram rotatably supporting said spindle at the rearward end thereof, actuating means located within said ram for automatically synchronizing the operation of said drawbolt rotating means and said ejector tube moving means, and a single drive motor for operating said actuating means.

4. The power drawbolt assembly of claim 2 in which said drawbolt rotating means includes a drive sleeve mounted on said drawbolt for relative axial movement, and said ejector tube moving means includes an actuator housing fixed at the rearward end of said spindle, a floating sleeve abutting said ejector tube and disposed within said housing for relative axial movement, a stop sleeve fixed to said drive sleeve and disposed within said housing for relative rotational and axial movement, said floating sleeve and stop sleeve each having coaxial projections adapted for threaded engagement upon said further rotation of said drawbolt in a tool unclamping direction after said drawbolt has completely unthreaded from a seated tool adaptor, and said floating sleeve and ejector tube being movable forwardly relative to said stop sleeve and spindle during threading engagement of said stop sleeve and floating sleeve projections.

5. The drawbolt assembly of claim 4 including a first spring means biasing said stop sleeve, drive sleeve and drawbolt in a rearward direction relative to said spindle, and a second spring means biasing said drawbolt in a forward direction relative to said drive sleeve and stop sleeve.

6. A power drawbolt assembly for releasably securing a tool in a socket of a machine tool spindle, the tool having a tool adaptor with a threaded bore, the combination comprising
  a drawbolt journeled within said spindle for axial and rotary movement with respect thereto,
  one end of said drawbolt having a threaded portion projecting into said socket for engaging an inserted tool adaptor,
  a drive sleeve mounted on said drawbolt for rotation with said drawbolt and axial movement relative to said drawbolt,
  a first biasing means urging said drive sleeve and drawbolt in a rearward direction relative to said spindle,
  a second biasing means urging said drawbolt in a forward direction relative to said drive sleeve,
  said drawbolt being movable rearwardly relative to said spindle and drive sleeve against the force of said second biasing means to absorb axial forces exerted on said drawbolt end upon insertion of a tool adaptor into said spindle socket,
  means for rotating said drive sleeve and drawbolt in one direction to threadably engage said drawbolt end with the bore of a tool adaptor placed in said socket to draw said tool adaptor into tight seating engagement with said socket,
  and means for rotating said drive sleeve and drawbolt in an opposite direction to threadably disengage and unclamp a seated tool adaptor in said socket.

7. The power drawbolt assembly of claim 6 including an ejector tube mounted on said drawbolt for relative axial movement, and means responsive to further rotation of said drawbolt in a tool unclamping direction after said drawbolt has completely unthreaded from a seated tool adaptor for axially moving said ejector tube in a forward axial direction relative to said spindle to strike a seated tool adaptor and positively release it from seating engagement with said socket.

8. The drawbolt assembly of claim 6 in which said drawbolt has a removable fastener secured at the rearward end thereof forming a shoulder, said first biasing means urging said drive sleeve toward engagement with said shoulder to bias said drawbolt in a rearward direction relative to said spindle, and said fastener being removable from said drawbolt to permit removal of said drawbolt from the forward socket end of said spindle.

9. A power drawbolt assembly for releasably securing a tool in the socket of a machine tool spindle, the tool having a tool adaptor with a threaded bore, and said spindle having keys at the end thereof for engaging an inserted tool adaptor, the combination comprising
  a drawbolt journeled within said spindle for axial and rotary movement with respect thereto,
  one end of said drawbolt having a threaded portion projecting into the socket for engaging an inserted tool adaptor,
  an ejector tube coaxially mounted on said drawbolt within said spindle bore for relative axial movement,
  means for rotating said drawbolt in one direction to threadably engage the end thereof with the bore of a tool adaptor placed in said socket for clamping said tool adaptor in tight seating engagement with said socket,
  means for rotating said drawbolt in an opposite direction to threadably disengage said drawbolt end from a seated tool adaptor in the spindle socket,
  and means for moving said ejector tube in a forward axial direction relative to said spindle and drawbolt after said drawbolt has threadably disengaged a seated tool adaptor to cause said ejector tube to strike and positively release said seated tool adaptor from seating engagement with said spindle socket.

10. The power drawbolt assembly of claim 9 including a single drive motor for driving both said drawbolt rotating means and said ejector tube moving means.

11. The power drawbolt assembly of claim 9 including a drive sleeve mounted on said drawbolt for rotation with said drawbolt, motor means for rotating said drive sleeve and drawbolt, and actuating means operated from said drive sleeve for synchronizing the operation of said ejector tube moving means so that said ejector tube strikes a seated tool adaptor only after the end of said drawbolt has completely unthreaded from engagement with the seated tool adaptor.

12. The power drawbolt assembly of claim 11 including a first spring means biasing said drive sleeve and drawbolt in a rearward direction relative to said spindle so that a tool adaptor inserted into said spindle socket engages said spindle drive keys prior to engaging said drawbolt, and a second spring means biasing said drawbolt in a forward direction relative to said drive sleeve whereby said drawbolt is resiliently supported within said spindle and absorbs excessive axial forces exerted upon said drawbolt during insertion of a tool adaptor into said spindle socket.

13. In a machine tool, the combination comprising a spindle having a bore therethrough opening into a socket for receiving an inserted tool adaptor, said tool adaptor having a threaded bore, a drawbolt disposed within said spindle bore for relative axial and rotational movement and having a threaded end extending into said socket for engaging the threaded bore of an inserted tool adaptor, a drive sleeve having a forwardly extending stop sleeve mounted on said drawbolt for rotation with said drawbolt and axial movement relative to said drawbolt and spindle, a floating sleeve having a forwardly extending ejector tube mounted on said drawbolt for rotation with said spindle and axial movement relative to said drawbolt and spindle, means for rotating said drive sleeve, stop sleeve, and drawbolt in one direction to threadably engage the end of said drawbolt with the threaded bore of a tool adaptor placed in said socket and to positively clamp said tool adaptor in a tight seating engagement with said socket, means for rotating said drive sleeve, stop sleeve and drawbolt in an opposite direction for threadably disengaging and unclamping a seated tool adaptor, and means responsive to further rotation of said drive sleeve, stop sleeve, and drawbolt in a tool unclamping direction after said drawbolt has completely unthreaded from a seated tool adaptor for axially moving said floating sleeve and ejector tube in a forward axial direction relative to said spindle to cause said ejector tube to strike a seated tool adaptor and positively release it from seating engagement with said spindle socket.

14. In a machine tool of claim 13 in which said drawbolt rotating means includes a motor for driving said drive sleeve, and including means for limiting axial movement of said stop sleeve relative to said spindle between forward and rear limits, a first spring means biasing said stop sleeve, drive sleeve and drawbolt in a rearward direction relative to said spindle, said stop sleeve being located at said rear limit under the biasing force of said first spring means when said drawbolt is not threadably engaging a tool adaptor, said stop sleeve being movable from said rear limit to said forward limit as said drawbolt threadably engages a tool adaptor in said spindle socket, and means responsive to said stop sleeve reaching said forward limit for automatically de-energizing said motor.

15. The drawbolt assembly of claim 14 including an actuator housing fixed at the rear end of said spindle within which said stop sleeve and floating sleeve are disposed, said floating sleeve being anchored to said housing for relative axial movement, said stop sleeve being disposed within said housing for relative axial and rotational movement, said means for limiting axial movement of said stop sleeve including a plurality of radial slots formed in said housing, and a spacer supported by said stop sleeve for relative rotational movement and having a plurality of radial projections each retained for limited axial movement in one of said radial housing slots.

16. In the machine tool of claim 15 in which said stop sleeve and floating sleeve each have coaxial threaded projections adapted for interengagement, said floating sleeve and stop sleeve projections being out of threaded engagement when said drawbolt is in fully threaded engagement with a seated tool adaptor, said stop sleeve being movable from said forward limit to said rear limit as said drawbolt is rotated to unclamp a seated tool adaptor, said stop sleeve and floating sleeve being threadably engageable during movement of said stop sleeve from said forward limit to said rear limit, said floating sleeve being movable in a forward direction relative to said stop sleeve and spindle in response to further rotation of said drawbolt and stop sleeve in a tool unclamping direction after said stop sleeve reaches said rear limit, said ejection tube being movable with said floating sleeve upon threaded engagement of said floating sleeve and stop sleeve projections for striking and positively releasing a tool adaptor from seating engagement with said spindle socket, and means responsive to movement of said floating sleeve to a predetermined forward position for the deenergizing of said motor.

17. In the machine tool of claim 16 in which said first spring means is interposed between said housing and said radial spacer projections, and a second spring means is interposed between said drawbolt and drive sleeve biasing said drawbolt in a forward direction relative to said drive sleeve.

* * * * *